United States Patent [19]
Klar et al.

[11] 4,025,733
[45] May 24, 1977

[54] PRESSURE SEAL HEADBAND

[75] Inventors: Irwin Klar, New City; Erwin H. Rock, Dobbs Ferry, both of N.Y.

[73] Assignee: American Electromedics Corporation, Dobbs Ferry, N.Y.

[22] Filed: Oct. 9, 1975

[21] Appl. No.: 621,057

[52] U.S. Cl. .................................... 179/156 R
[51] Int. Cl.² ...................................... H04M 1/05
[58] Field of Search ................. 179/156 R, 18 LR; 128/409

[56] References Cited
UNITED STATES PATENTS

| | | | |
|---|---|---|---|
| 3,469,651 | 9/1969 | Mendelson et al. | 179/182 R X |
| 3,919,501 | 11/1975 | Cech et al. | 179/156 R |

*Primary Examiner*—William C. Cooper
*Attorney, Agent, or Firm*—Holland, Armstrong, Wilkie & Previto

[57] ABSTRACT

An improved headband is described for use in the clinical evaluation of hearing and hearing problems. There are a number of important tests of hearing which utilize test probes and other ear testing members which are conveniently held in place at the patient's ears using headbands. The headband described herein has improved means for adjustably positioning the probes or other test members and particularly for both aligning the probe and for adjusting the probe tip seating or sealing pressure at the ear canal under test. A universally adjustable probe mounting is provided on the headband for adjusting the attitude of the test probe tip and the probe support includes means for adjusting the force urging the probe tip into the ear canal under test.

11 Claims, 7 Drawing Figures

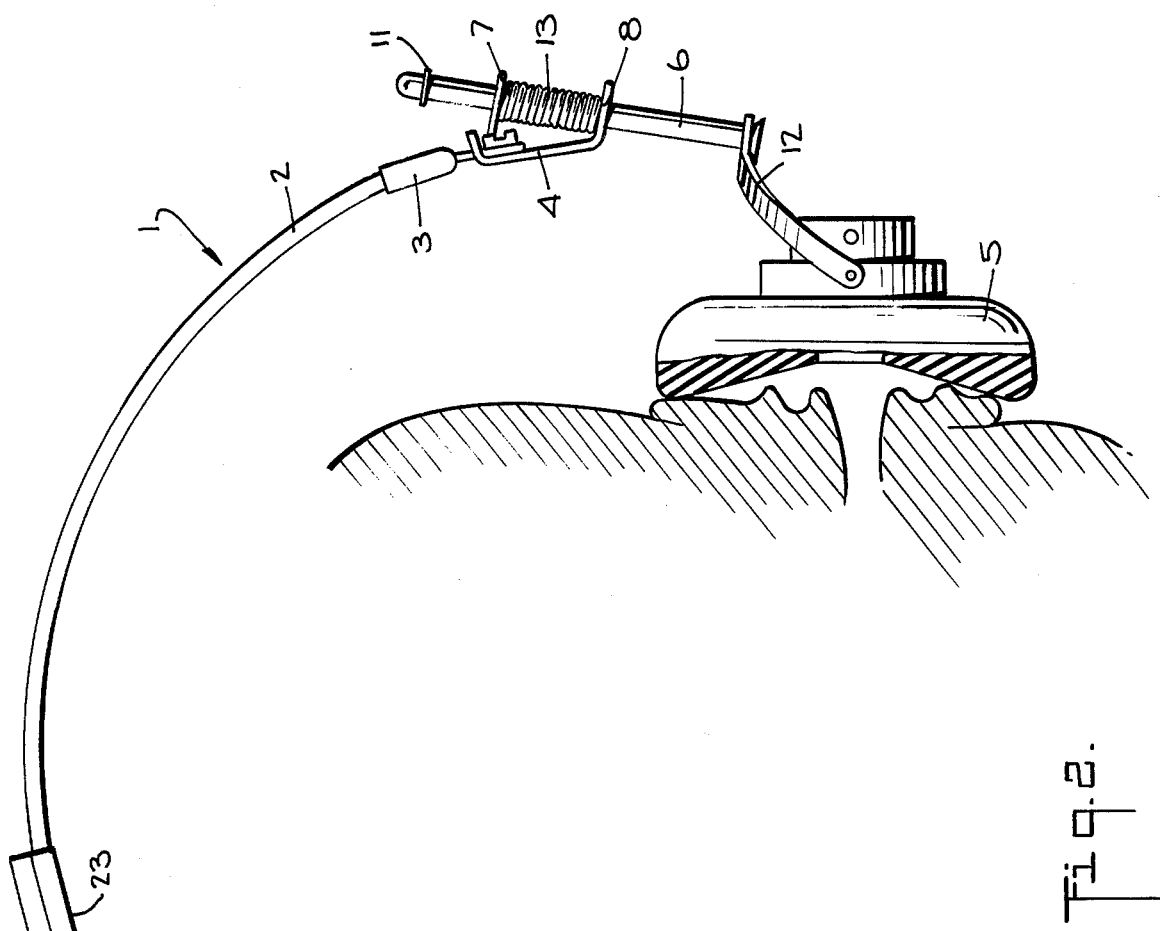

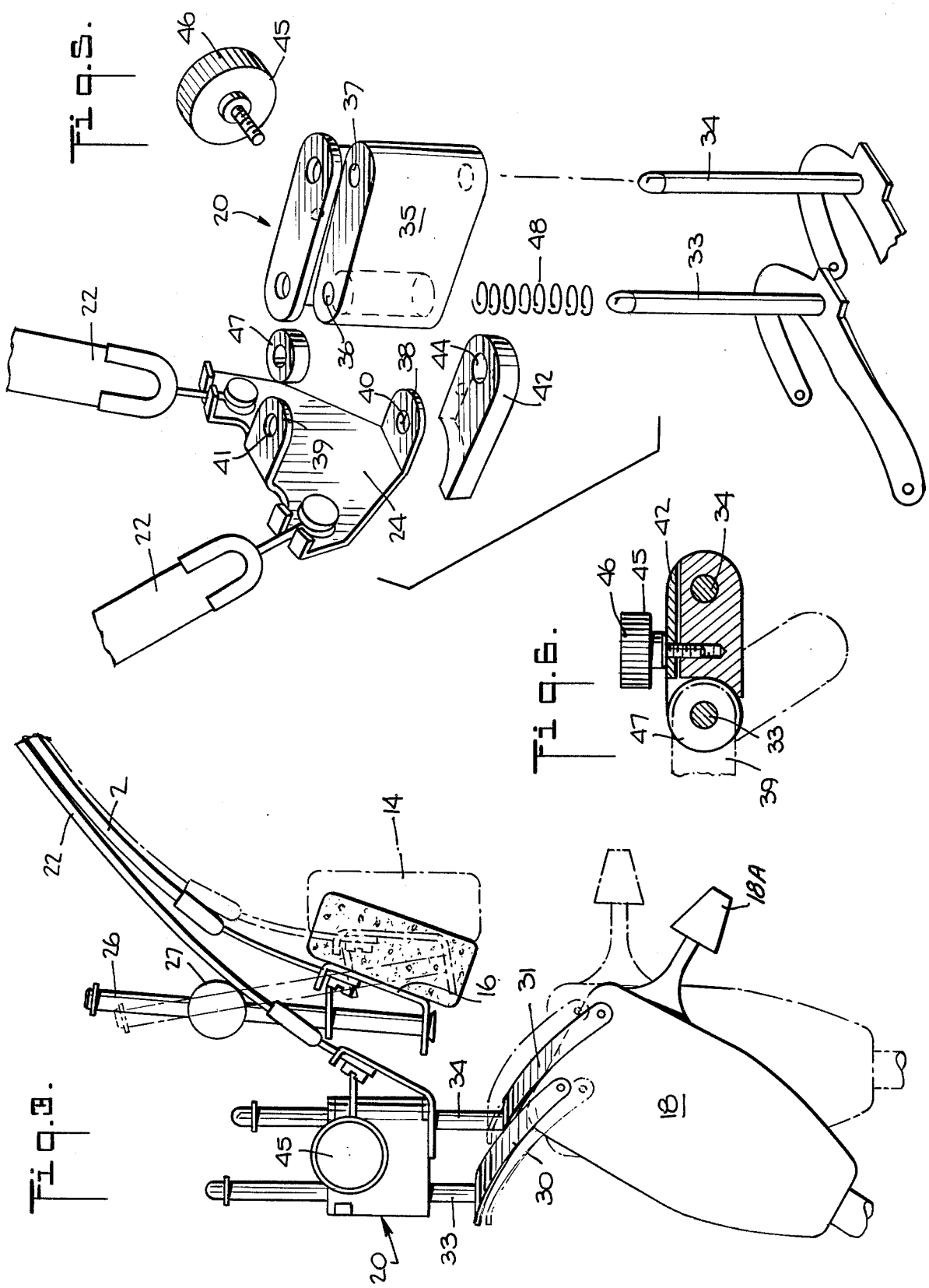

PRESSURE SEAL HEADBAND

BACKGROUND OF THE INVENTION

The present invention relates generally to the clinical evaluation of hearing loss and more particularly to an improved adjustable headband for the test probes and other earphones which are applied to the patient's ears for the test.

There are a number of important tests for evaluating hearing losses which use a test probe which is applied to the patient's ear under test. These tests require the probe to be placed in the patient's ear with a pressure seal between the probe and the ear canal to permit an adjustment of the air pressure within the ear canal under test. The improved headband of this invention facilitates the insertion of the probe and the formation of the pressure seal by providing for an adjustment of the probe attitude or position as well as providing for an adjustment of the resilient holding force or pressure at which the probe tip is urged into the patient's ear. The improved headband construction permits rapid and precise and simplified adjustments of the probe position and mounting pressure or force. The preferred adjusting means and pressure control means facilitates both the initial adjustments and the retention of the adjustments during the test period and during any movements which may be made by the patient during the test period.

Accordingly, an object of the present invention is to provide an improved headband for mounting clinical test probes or earphones and the like for hearing tests.

Another object of the present invention is to provide an improved headband providing for easily made fine adjustments of test probe positions. Another object of the present invention is to provide an improved adjustable pressure seal test headband which is more easily adjusted by the operators and more comfortable for patients.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings forming a part of the specification, wherein:

FIG. 3 is a fragmentary front elevational view illustrating the probe mounting and pressure adjusting means.

FIG. 5 is an exploded perspective view of the adjustable probe mounting means.

FIG. 6 is a horizontal sectional view of the adjustable probe support.

FIG. 7 is a vertical sectional view of the probe support taken along line 7—7 on FIG. 2.

DESCRIPTION OF THE PREFERRED EMBODIMENT

Figure 1:
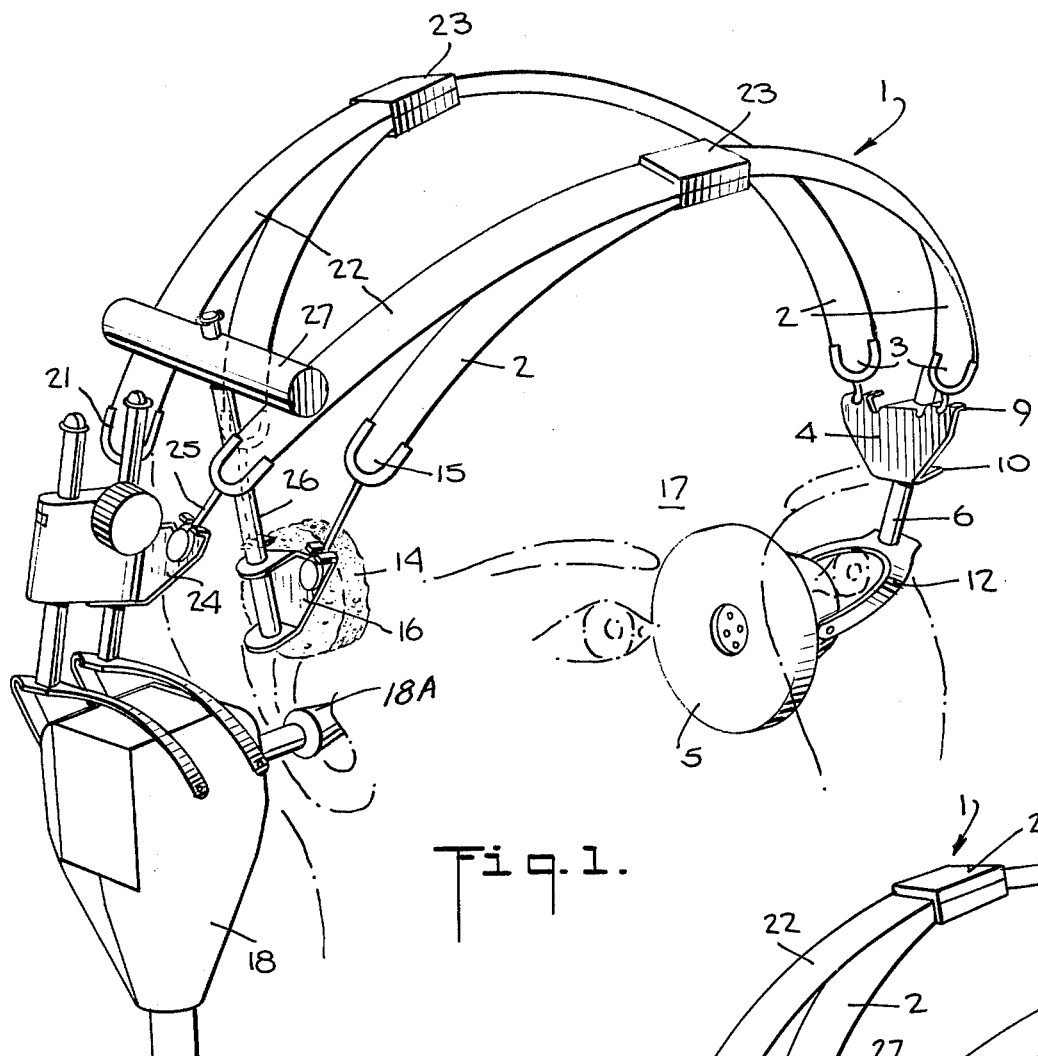
FIG. 1 is a perspective view of a preferred embodiment of the headband in its test position on a patient.

The improved headband will now be described as it is used to adjustably position a hearing test probe tip in a patient's ear with or without an additional headphone used in the patient's opposite ear. There are a number of hearing tests which utilize a tone generating probe tip in one of the patients's ears and a separate earphone in the opposite ear. The probe itself, such as the probe shown mounted on the headband, is used in a variety of tests where a pressure seal is made between the probe tip and the patient's ear canal.

In order to create and to maintain the pressure seal, it is necessary that the probe together with its resilient inner tip or cuff be held in a particular alignment or attitude with respect to the patient's ear canal and also that the probe tip be urged against the ear canal with sufficient force to create and to maintain the pressure seal.

As will be described more fully below, the headband permits the level of the probe to be raised or lowered and the exact angle of entry of the probe tip into the ear to be set by the clinician. These adjustments may be made utilizing a single clamping knob which loosens the probe mounting 20 for the necessary attitude adjustments. A second control on the headband adjustably controls the contact pressure between the probe tip and the ear canal.

The headband 1 has a pair of resilient head straps 2 covered with a suitable soft outer coating material. One end 3 of each strap 2 is connected to a headphone support bracket 4 which adjustably positions a headphone 5 on support shaft 6. The support bracket 4 has upper and lower shaft mounting holes 7 and 8 (FIG. 2) in spaced flanges 9 and 10. The support shaft 6 is permitted to slide up and down between an upper limit washer 11 and the headphone clip 12. A coil spring 13 compressed between the mounting flanges 9 and 10 frictionally engages the shaft 6 to maintain it at its adjusted position. The mounting holes 7 and 8 in the support flanges 9 and 10 permit a limited swiveling of the support shaft 6 about its longitudinal axis to accommodate the headphone 5 to the patient's ear after the shaft 6 has been raised or lowered to the proper height. If the particular test being performed does not require the headphone 5, it may be used as a simple support pad or a pad may be used in its place.

A mounting pad 14 is connected to the opposite ends 15 of the straps 2 on a suitable mounting bracket 16. The pad 14 is positioned on the patient's head 17 to properly position the headphone 5 as well as a test probe 18 as the test probe 18 is further adjusted in the manner described below.

An adjustable probe mounting 20 is attached to the outer ends 21 of a pair of additional flexible straps 22. The straps 22 are attached at their inner ends by fasteners 23 to the above described head straps 2. The probe mounting 20 includes a support bracket 24 coupled by end wires 25 to the support straps 22.

Figure 2:
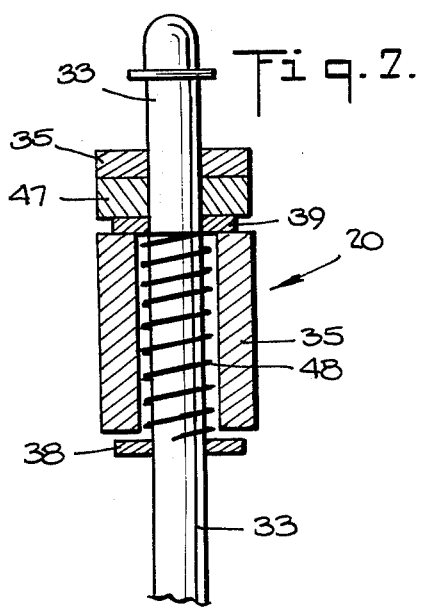
FIG. 2 is a front elevational view, partially in section, of a headband in its test position.
Figure 4:
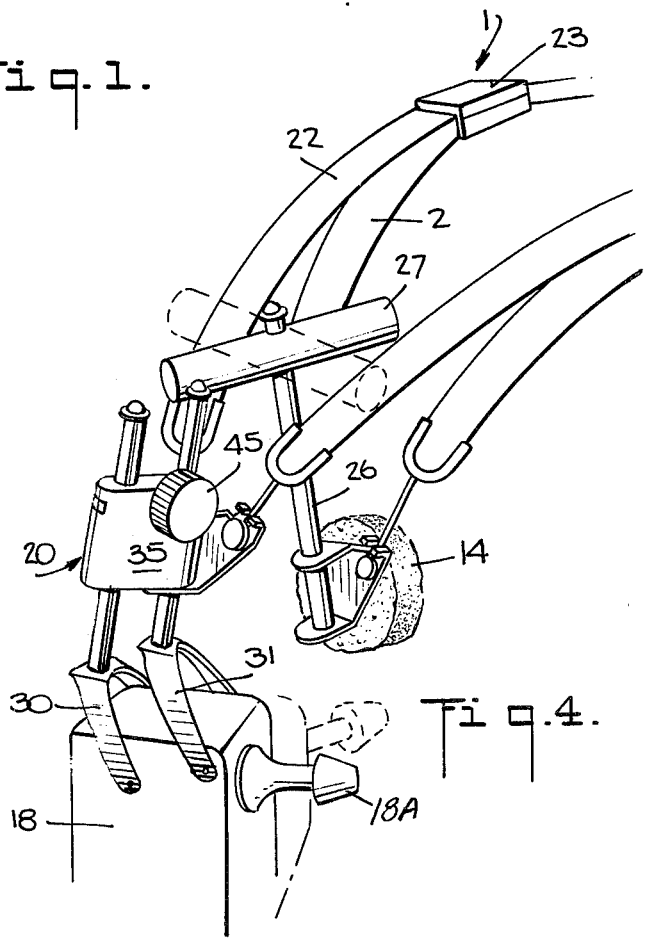
FIG. 4 is a fragmentary perspective view of the probe mounting and pressure adjusting means.

A pressure adjustment for the probe 18 includes an upwardly extending post 26 fixedly mounted on the support bracket 16 for the pad 14 and the two straps 22. A pressure adjusting knob 27 is slidably mounted on the post 26 so that its outer ends engage the two support straps 22. The pressure on the test probe 18 is increased by moving the knob 27 downwardly on the post 26 causing the resilient straps 22 to be forced downwardly and inwardly with a corresponding downward and inward movement of the probe mounting 20. After the knob 27 has been moved down to the desired position on the post 26 it stays in its depressed position as a result of the upward pressure of straps 22 swinging the knob 27 into a frictionally engaged and locked position on the post 26. This frictional engagement is facilitated by the downwardly and outwardly flaring shape of the post accommodating aperture 28 in the knob 27 as best illustrated in FIG. 2. The knob 27 may be raised to release the pressure by swinging it clear of the straps 22 thereby releasing the back pressure on it as illustrated in solid lines in FIG. 4. This simple and convenient pressure adjustment is readily operated by the clinician as he places the headband 1 into position on the patient's head.

The adjustment of the attitude and vertical position of the probe 18 is made at the probe mounting 20 as will now be described.

The adjustable probe mounting 20, which will now be described, is provided to give a full adjustment of the attitude or angle at which the test probe tip 18A is placed in the patient's ear. For example, the angle of insertion of the probe tip 18A may be adjusted both in the horizontal and in the vertical planes thereby providing full adjustment of the insertion angle of the probe 18. Additionally, the adjustable mounting 20 permits the probe tip 18A to be raised and lowered vertically with respect to the patient's ear canal. These adjustments plus the additional capacity of the clinician to make minor adjustment of the headband position itself including the position of the support pad 14 on the patient's head and the probe pressure adjustment already described result in a fully adjustable probe supporting headband.

A preferred form of probe 18 is illustrated at 18, however, it is clear that other types of probes may be used. This preferred probe includes provisions for removably attaching the probe 18 to the probe mounting 20 on two generally parallel and spaced support clips 30 and 31. The clips 30 and 31 are releasably attached to the probe 18 by providing detents in the probe 18 surface and corrseponding bearing pins 32 on the ends of the clips 30 and 31.

Two mounting shafts 33 and 34, for the clips 30 and 31, are adjustably supported by a swivel member 35 having generally vertical holes 36 and 37 (FIG. 5) to receive the two shafts 33 and 34. The swivel member 35 is pivotally attached to the support bracket 24 by bearing flanges 38 and 39 on the bracket 24 which include apertures 40 and 41 to receive the inner shaft 33.

The swivel member 35 includes a clamp 42 positioned in a slot 43 and having an aperture 44 which pivots on the outer support post 34. The clamp 42 is threadedly engages by a threaded knob 45 having a gripping surface 46 convenient to the clinician. The clamp 42 is tightened by rotation of the knob 45 to fix the angular position of the swivel member 35 about the inner shaft 33 and also to fix the vertical positions of the two shafts 33 and 34.

Simultaneous upward or downward movement of the two shafts 33 and 34, with a loosened knob 45, adjusts the level or vertical position of the probe 18 for the position of the ear canal of the particular patient under test. Relative movement of one shaft 33 or 34 with respect to the other, in the manner illustrated in FIG. 3, adjusts the angle of the probe tip 18A in a vertical plane. An additional adjustment of the probe tip 18A angle in a horizontal plane is made, with a loosened knob 45, by rotating the swivel member 35 about its axis on the inner support shaft 33. These adjustments are made after the desired probe tip 18A pressure has been set by an adjustment of the pressure knob 27, as described above.

When the adjustments are completed, the knob 45 is tightened causing the inner end of the clamp 42 to engage the surface of a bearing member 47 (FIG. 6) rigidly attached to the upper support flange 39. The tightening of the knob 45 simultaneously draws the shaft holes 36 and 37 in the swivel member 35 against the shafts 33 and 34 locking them in their adjusted levels. The setting of the test probe 18 position is ficilitated by a friction member positioned within the inner hole 36 of the swivel member 35 such as a coil spring 48 which is compressed so that it engages the inner shaft 33 with a sufficient friction force to releasbly lock the inner shaft 33 in the position set by the clinician.

It will be seen that an improved test headband has been described which is more easily used and which provides better test results because of its capability for a rapid and exact adjustment of test probes to the patient's head 5. The improved headband is of particular value for tests where the procedure makes use of probes which must seal the ear canal as the ear canal pressure is adjusted during the tests. Where such a pressure seal is required, it is of utmost importance that the probe be properly positioned for creating and for maintaining a proper pressure seal for the test. The improved headband facilitates such positioning.

In order to provide for useful testing with pressure seals, it is also necessary that the formation of the pressure seal and the related adjustments be expeditiously and simply performed to permit the test to be carried out in a suitably short test interval. The above described headband with its capability of rapid adjustment of the test probe positions accomplishes these results.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. An improved head support for adjustably positioning a test probe tip in a patient's ear comprising the combination of:
   a probe support for attachment to the patient's head;
   a probe mounting positioned on the probe support;
   a test probe having a probe tip positioned on said probe mounting;
   said probe mounting including adjusting means for adjusting the insertion angle and level of the test probe tip and the pressure exerted by the test probe tip with respect to the patient's ear; and
   said probe support and said probe pressure adjusting means each comprising resilient strap members.

2. The head support as claimed in claim 1 in which said probe tip pressure adjusting means comprises means for adjustably coupling said resilient strap members together.

3. The head support as claimed in claim 1 in which said probe tip angle and level adjusting means comprises a swivel member pivotally attached to said probe support, and a shaft slidably attaching the test probe to said swivel member.

4. The head support as claimed in claim 3 which further comprises a second shaft slidably connecting the test probe to said swivel member whereby relative movement of said shaft changes the probe tip insertion angle.

5. The head support as claimed in claim 4 in which said swivel member includes a calmp releasably engaging the probe support and the shafts.

6. An improved headband for adjustably positioning a test probe tip in a patient's ear comprising the combination of:

flexible band means;

head engaging members mounted on opposite ends of the band means;

a support means projecting from one end of said band means for supporting a probe mounting;

an adjustable probe mounting positioned on the outer end of said support means;

a test probe having a test probe tip positioned on said probe mounting;

means for adjusting the position of said probe mounting with respect to said band means; and said probe mounting including additional adjusting means for adjusting the insertion angle and level of the test probe tip with respect to the patient's ear.

7. The headband as claimed in claim 6 in which said support means comprises a resilient member, and said means for adjusting the position of said probe mounting comprises an adjusting member for adjustably bending the resilient means toward and away from said flexible band means.

8. The headband as claimed in claim 7 in which said adjusting member comprises a shaft and a movable knob adjustably the said flexible band means and said support means.

9. The headband as claimed in claim 6 in which said probe tip angle and level adjusting means comprises a swivel member pivotally attached to said support means, and a shaft slidably attaching the test probe to said swivel member.

10. The head support as claimed in claim 9 which further comprises a second shaft slidably connecting the test probe and said swivel member whereby relative movement of said shafts changes the probe tip insertion angle.

11. The head support as claimed in claim 10 in which said swivel member includes a clamp releasably engaging the support means and the shafts.

* * * * *